G. SINCLAIR.
AIR PURIFIER AND TEMPERATURE REGULATOR.
APPLICATION FILED JULY 25, 1914.
1,161,350.
Patented Nov. 23, 1915.
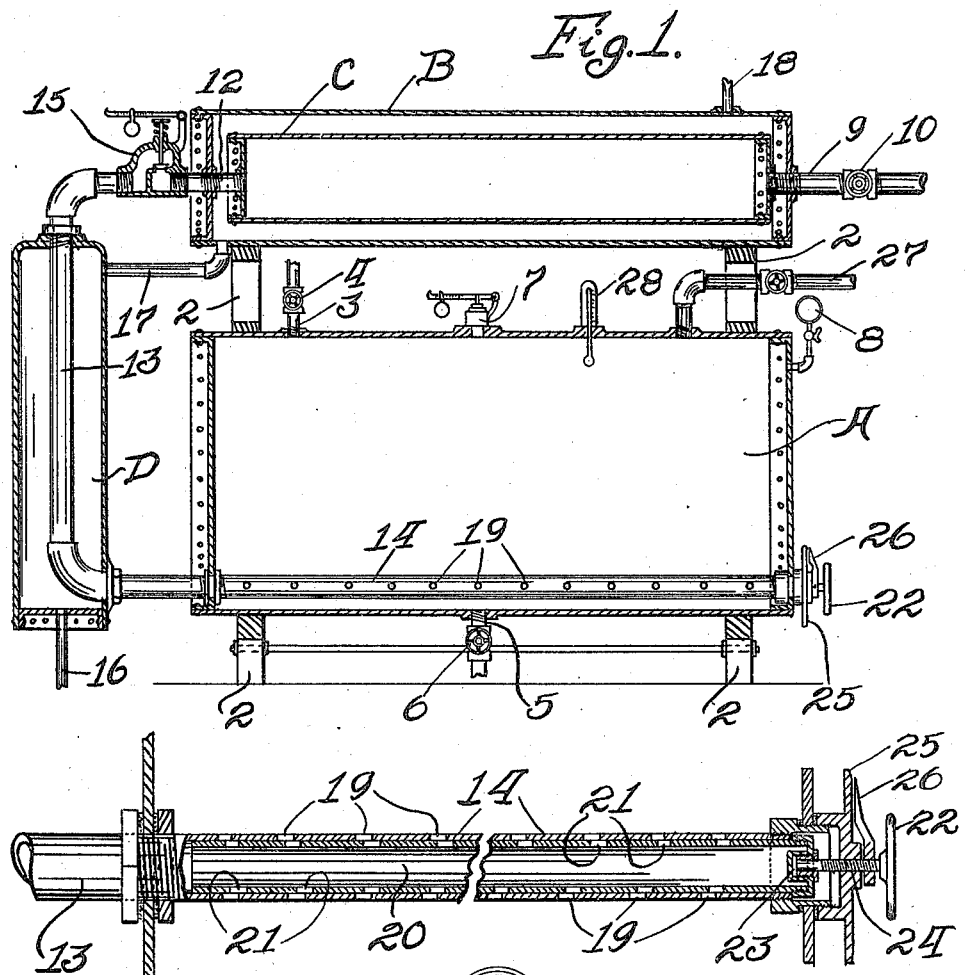
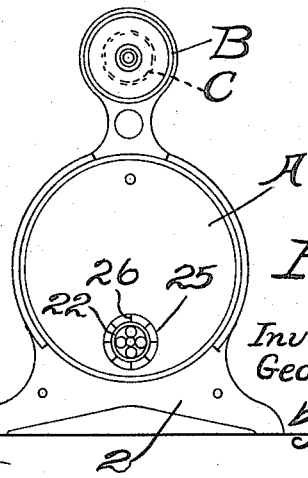
Witnesses:
Inventor:
George Sinclair
by: Bradbury
Attorney.

UNITED STATES PATENT OFFICE.

GEORGE SINCLAIR, OF ST. PAUL, MINNESOTA, ASSIGNOR, BY DIRECT AND MESNE ASSIGNMENTS, TO CLIFFORD L. NILES, OF ANAMOSA, IOWA.

AIR-PURIFIER AND TEMPERATURE-REGULATOR.

1,161,350.

Specification of Letters Patent. Patented Nov. 23, 1915.

Application filed July 25, 1914. Serial No. 853,187.

*To all whom it may concern:*

Be it known that I, GEORGE SINCLAIR, a citizen of the United States, residing at St. Paul, in the county of Ramsey and State of Minnesota, have invented a new and useful Improvement in Air-Purifiers and Temperature-Regulators, of which the following is a specification.

The object of my invention is to cleanse, moisten and deliver purified and moistened air at any desired predetermined temperature for use.

The invention is especially designed for use in making butter although there are many uses to which this air can be applied. It will be understood that while the cream is ripening, to obtain the best flavor for the butter the cream must be kept at a certain temperature such as 52 degrees or as may be desired. By the use of my device air can be purified and delivered into the cream while ripening at the desired temperature and can be maintained at a uniform temperature for any desired period regardless of the temperature of the air before entering the improved device.

In the drawings with which I have illustrated my invention and which form part of the specification, Figure 1 is a sectional elevation illustrating my device; Fig. 2 is an end elevation of Fig. 1 and Fig. 3 is a longitudinal section of a detail of my invention.

In the drawings A indicates a water tank of ordinary construction which is mounted on a frame 2 and has an inlet for water through pipe 3, which is closed by a valve 4. At the bottom of the tank A is a suitable drain pipe 5, which is closed by a valve 6. The tank A has a safety valve 7 of ordinary construction and a pressure gage 8 which indicates the pressure at which the air is maintained in the tank.

Above the tank A and mounted on the frame 2 is a smaller water tank B in which is centrally located an air pressure tank C. Air is forced into the tank C at one end through a pipe 9, which is connected to a blower or air pump, and a suitable valve 10 in said pipe of ordinary construction prevents air from passing back out of the tank C through the pipe 9. The tank C may be fitted with a safety valve of ordinary construction (not shown) which prevents any excess pressure in the tank.

The air is automatically passed from the tank C into the tank A through pipes 12, 13, 14 and the valve 15 which connects the pipes 12 and 13 and is constructed similarly to the ordinary safety valve being set at the desired escaping pressure. The pipe 13 passes through a water tank D which has a water intake pipe 16 in its bottom and an outlet 17 at the top which connects with the tank B, the tank B having an outlet 18.

The pipe 14 is secured in the tank A in any suitable manner and has perforations 19 which are opened and closed by a movable sleeve 20 (see Fig. 3) which fits inside the pipe 14 and has openings 21 corresponding in size with the openings 19. The sleeve 20 is operated by a handle 22 which is connected thereto by a threaded stem 24 and a swiveled joint 23 of ordinary construction. When the handle 22 is turned the sleeve 20 is drawn back and forth in the pipe 14 and the openings 19 and 21 are brought to correspond thereby allowing the air to pass from the pipe 14 into the tank A (as illustrated in Fig. 3 where the openings 19 are shown in partly closed position). This air entering the tank under pressure raises the pressure maintained in the tank. A graduated dial 25 is fixed between the tank A and the handle 22 and an indicating finger 26 adjustably fixed on the stem 24 serves to indicate the open and closed positions of the openings 19 in the pipe 14. Thus the size of the openings can be readily adjusted as desired to increase or decrease the flow of air in the tank A.

In the operation of my device when it is desired to obtain a flow of cold air, well water or cold water is circulated through the intake pipe 16 and tank D thence into the tank B through the pipe 17 and out of pipe 18 and the tank A is filled about two thirds full of cold water. Then the valve 15 is set at the desired escaping pressure and air is blown or pumped into the tank C through the pipe 9 where it is compressed and cooled by the flow of water through the tank B. As the air passes onward it comes into contact with colder and colder radiating surfaces as it approaches the source of supply of the cooling medium entering tank D through pipe 16. The openings in the pipe 14 are adjusted by handle 22 and air is passed through the pipes 13 and 14 into the tank A where it passes through the water which purifies it and out of the pipe 27 to the cream tanks, the air being injected into the cream in the usual manner. It will thus be noted that as the air is cooled under pressure, when it is released to normal pressure it will absorb heat and by careful adjustment of my device it can be delivered at a uniform temperature in an economical way.

A thermometer 28 in tank A assists the operator in adjusting my device to the desired temperature. It is obvious that the air can be cooled more or less as desired by the adjustment of my device.

It is an important feature that it is not necessary to use ice in the water in tank A to keep the temperature of the water down when a uniform flow of cool air is desired, and that the flow of air can be delivered at the same temperature for a long period without renewing the water in tank A and only changing the temperature of the same two or three degrees. Thus in operation the water is renewed in the tank A about once a day in order to purify the air from dust, etc., but not for the purpose of cooling the air.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. In an air purifier and temperature regulator, an air tank adapted to receive air under pressure, means for cooling compressed air in said tank, a water tank communicating therewith, a perforated pipe extending across the bottom of said water tank, a valve for automatically releasing the air in said compressing tank at a reduced pressure through said perforated pipe and into the water in said water tank to purify the same.

2. In an air purifier and temperature regulator, an air supply tank, means for cooling said air, means for automatically passing said air from said tank into a volume of water to purify said air and means for gradually cooling said air as it approaches said tank.

3. A device of the class set forth, an air supply tank, a water tank, means for automatically delivering purified air from said air supply tank into said water tank, and means for applying to said air supply tank and delivering means a cooling medium of constantly decreasing temperature in a plurality of steps.

4. In a device of the class set forth, an air supply tank, a water jacket about said tank through which water is adapted to be circulated, a valve adapted to automatically release the air in said tank at a predetermined pressure and means for passing the air so released from said tank through a volume of water to purify said air.

5. In a device of the class set forth, an air supply tank, means for cooling the air in said tank, an adjustable valve for automatically releasing the air from said tank at a predetermined pressure, a water tank communicating with said air tank adapted to contain a volume of water and a perforated pipe in said water tank adapted to distribute air from said valve into said water to purify said air.

In testimony whereof, I have signed my name to this specification, in the presence of two subscribing witnesses.

GEORGE SINCLAIR.

Witnesses:
STELLA L. WASCHENBERGER,
F. G. BRADBURY.

Copies of this patent may be obtained for five cents each, by addressing the "Commissioner of Patents, Washington, D. C."